Patented Apr. 18, 1933

1,903,862

UNITED STATES PATENT OFFICE

PAUL GROSSMANN, OF BASEL, SWITZERLAND, ASSIGNOR TO THE FIRM SOCIETY OF CHEMICAL INDUSTRY IN BASLE, OF BASEL, SWITZERLAND

PROCESS FOR ELIMINATING SULPHONIC ACID GROUPS FROM DIHYDROXYDIAMINO-ANTHRAQUINONEDISULPHONIC ACID

No Drawing. Application filed February 1, 1932, Serial No. 590,312, and in Switzerland February 3, 1931.

British patent specification No. 274,966 discloses the fact that by boiling 1:4-hydroxyaminoanthraquinone-β-sulphonic acids with sodium hydrosulphite and an excess of caustic soda solution, there is obtained the corresponding leuco-hydroxyanthraquinone. Thus there happens an elimination of the sulphonic acid group and simultaneous exchange of the amino-group for a hydroxy-group, whereby the final product is a leuco-body.

According to the present invention the sulphonic acid groups are eliminated from homonuclear anthraquinone-β-sulphonic acids containing as substituents hydroxy-, amino-, alkylamino- or arylamino-groups, and which may contain also heteronuclear substituents of any kind, by careful control of the proportion of the reducing agent, within certain limits of temperature and by operating, with exclusion of air, in strong alkaline solution, without attack of the amino-groups, so that the desulphonated anthraquinone derivatives themselves are obtained.

Patent No. 1,782,747 describes the elimination of sulphonic acid groups by treating with alkalies a hydro-derivative of a homonuclear substituted anthraquinone-β-sulphonic acid. This property of the hydro-derivatives is shown, however, to be in express contrast to the properties of the leuco-derivatives and the essence of the invention in that specification is the tendency for the hydro-derivatives, in contrast with the leuco-derivatives, to lose the sulphonic acid groups by treatment with alkalies.

It could not therefore be foreseen with certainty that the sulphonic acid groups could be eliminated in a similar smooth manner also from definite leuco-derivatives. That the bodies with which the examples in the present application are concerned are characterized as leuco-derivatives in the last-named specification, follows both from the method by which they are produced and their properties. The hydro-derivatives produced as described in the last-named specification are formed only in feebly acid, neutral or feebly alkaline solution. When caustic soda solution is used they are produced only under the condition that there is not more than a very small excess of caustic soda solution (cf. Patent No. 1,782,747). In contrast therewith, in the following examples about 8–16 molecules of caustic soda solution are used, so that at the end of the reaction there is still present a considerable excess in respect of the molecular proportion of caustic soda solution. In a case in which too large an excess of caustic soda solution must be avoided, it is to be supposed that the reason is not that the sulphonic acid groups may not be eliminated but that the amino-groups may be affected at room temperature. According to Patent No. 1,782,747, these products are characterized as leuco-derivatives by their capacity for being oxidized by atmospheric oxygen and by their relative stability towards strong alkalies.

From the process of Patent No. 1,782,747 the present invention is distinguished by the fact that not only hydrosulphite, but also cheaper reducing agents, for instance zinc dust, aluminium bronze, or metals, or metal alloys of like action can be used with practical result. Furthermore, the present invention permits operation in considerably more concentrated solutions, which is an important technical advantage.

The present process is especially important if compounds of the general formula

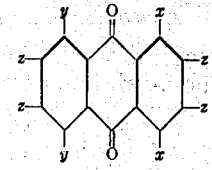

in which $x$ stands for OH or an NHR-group (R meaning hydrogen, alkyl or aryl), $y$ for hydrogen, halogen, $SO_3H$, an OR or an NHR-group (R meaning hydrogen, alkyl or aryl), and in which of the $z$'s standing in 2- and 3-position one means an $SO_3H$-group and the other a hydrogen atom, and of the $z$'s standing in 6- and 7-position one means a hydrogen atom and the other a hydrogen atom or an $SO_3H$-group, are subjected to the claimed reaction.

As may be seen from the following examples, the most favorable temperature is about 0°, i. e. temperatures which may lie somewhat below the freezing point of water or which are not essentially higher.

The following examples illustrate the invention, the parts being by weight:—

Example 1

3.55 parts of sodium 1-hydroxy-4-amino-anthraquinone-2-sulfonate of the formula

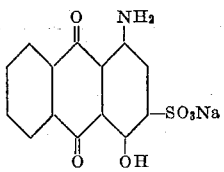

of about 95 per cent. strength are mixed with 70 parts of water and 20 parts of caustic soda solution of 33 per cent. strength, and, while air is excluded, there is run in at 0° C. to −5° C. a solution of 2.3 parts of sodium hydrosulphite of 85 per cent. strength in 15 parts of water. The solution becomes brownish yellow, the leuco-body being formed. It is kept at about −5° C. until all the parent material has been reduced to the leuco-body and is then warmed gradually to 40° C. until the sulphonic group has been eliminated, whereby the sodium salt of 1-hydroxy-4-amino-anthraquinone is produced. The product is isolated as such or is completely precipitated by means of hydrochloric acid, filtered, washed and dried. 1-amino-4-hydroxyanthraquinone is thus obtained of excellent purity.

Instead of 2.3 parts of hydrosulphite there may be used 0.22–0.25 parts of aluminum bronze. The reduction may also be effected by means of hydrogen, if the operation be conducted in the presence of a freshly prepared nickel catalyst under an excess pressure of 0.2 atmosphere.

The reaction is similar when the isomeric 1-amino-4-hydroxyanthraquinone-2-sulphonic acid is used.

Example 2

4.3 parts of sodium 1-amino-4-phenylaminoanthraquinone-2-sulphonate of the formula

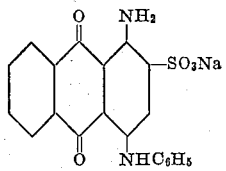

of about 95 per cent. strength, are mixed with 50 parts of water and 7 parts of caustic soda solution of 33 per cent. strength, and the whole is cooled to −5° C. There are then added in an atmosphere of coal-gas 2 parts of sodium hydrosulphite of 85 per cent. strength in 20 parts of water, whereupon the solution becomes brown owing to the formation of the leuco-body. The mixture is now heated in an atmosphere of coal gas to 50–60° C., whereby the sulphonic group is eliminated, and there is obtained a good yield of 1-amino-4-phenylaminoanthraquinone of a high degree of purity; this is isolated in the usual manner.

Instead of sodium hydrosulphite there may be used, for example, zinc dust, as a reducing agent.

It is essential in this invention that heating to a temperature over 0° C. should only occur after the parent material has been converted completely into the leuco-compound. It is possible to work with 2 to 3 times the proportion of alkali named if the temperature is correspondingly lower. If the hydrosulphite is added at room temperature and the whole is then heated immediately to 50° C., there is obtained a product which, probably in consequence of the elimination of amino-groups, dissolves in organic solvents to a solution which is redder than that of pure 1-amino-4-phenylaminoanthraquinone.

Example 3

5.5 parts of sodium 1-amino-4-phenyl-aminoanthraquinone-2:5-disulphonate of the formula

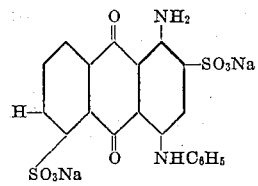

of about 90 per cent. strength are mixed in 50 parts of water with 20 parts of caustic soda solution of 33 per cent. strength. There are then added, at about −5° C. with exclusion of air, 2 parts of sodium hydrosulphite of 85 per cent. strength in 20 parts of water. When all the parent material has been converted into the leuco-body the whole is maintained for several hours at room temperature, whereby, with elimination of the β-sulphonic group, sodium 1-amino-4-phenyl-aminoanthraquinone-5-sulphonate is produced.

This is filtered and washed with a solution of common salt.

Example 4

5.05 parts of sodium 1:4-dihydroxyanthra-quinone-2-sulphonate of the formula

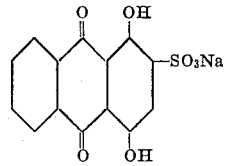

of about 70 per cent. strength are mixed in 50 parts of water with 20 parts of caustic soda solution of 33 per cent. strength. There are then added, at −5° C. with exclusion of air, 2.1 parts of sodium hydrosulphite of 85 per cent. strength in 20 parts of water, and the temperature is afterwards maintained for some hours at that of the room. By precipitation with hydrochloric acid quinizarine is obtained of excellent purity.

*Example 5*

5.2 parts of sodium 1 : 5-diamino-4 : 8-dihydroxyanthraquinone-3 : 7-disulphonate of the formula

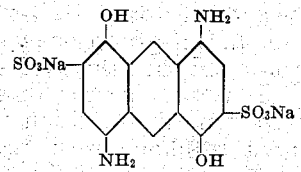

of about 92 per cent. strength are mixed in 80 parts of water with 16 parts of caustic soda solution of 33 per cent. strength. There is allowed to flow in quickly, with exclusion of air, for instance in an atmosphere of coal-gas or nitrogen, at about −5° C., a solution of 1.8 parts of sodium hydrosulphite in 25 parts of water. The solution becomes brown-yellow with formation of the leuco-compound, from which, by maintenance with exclusion of air at room temperature for several hours, one sulphonic acid group is eliminated. There is formed sodium 1 : 5-diamino-4 : 8-dihydroxyanthraquinone - 3 - monosulphonate; this separates in the form of lustrous crystals in good yield and purity and is worked up as usual.

*Example 6*

5.2 parts of the technical mixture of sodium 1 : 5 - diamino - 4 : 8-dihydroxyanthraquinone-3 : 7-disulphonate and 1 : 8-diamino-4 : 5-dihydroxyanthraquinone-3 : 6-disulphonate are mixed in 80 parts of water in an atmosphere of nitrogen at 0° to −5° C. with 7 parts of caustic soda solution of 33 per cent. strength and 0.7 parts of zinc dust, and the whole is stirred for about 3 hours at the temperature named. When all the zinc dust has been consumed, the color of the solution having passed from blue to brown-yellow, the whole is warmed to about 50° C.; one sulphonic acid group is eliminated and the monosulphonic acid of the aforesaid anthraquinone derivative is produced in good yield and of good purity. It is worked up in the usual manner.

*Example 7*

5.2 parts of sodium 1 : 5-diamino-4 : 8-dihydroxyanthraquinone-3 : 7-disulphonate of about 92 per cent. strength are mixed in 80 parts of water, in an atmosphere of nitrogen and at 0° to −5° C., with 14 parts of caustic soda solution of 33 per cent. strength and 0.9 part of zinc dust. The whole is stirred for 3 hours at the same temperature. On heating the mixture to 50° C., one sulphonic acid group is eliminated. The mixture is then cooled again to 0° to −5° C. and 1 part of zinc dust is added. After about 3 hours, heating to 50° C. is repeated whereby there is obtained in good yield and purity para-diaminoanthrarufine, which is worked up in the usual way. Any residual zinc compound may be separated by washing it out with dilute acid.

*Example 8*

5.2 parts of sodium 1 : 8-diamino-4 : 5-dihydroxyanthraquinone-3 : 6-disulphonate of the formula

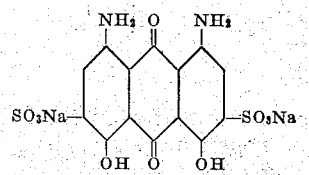

of about 92 per cent. strength are fixed in fine state of subdivision with 80 parts of water and 9.6 parts of caustic soda solution of 33 per cent. strength at −8° C. There are then added, with exclusion of air, 4.2 parts of sodium hydrosulphite dissolved in 30 parts of water, and the whole is kept for about 2 hours at −5° C. whereupon the temperature is allowed to rise very gradually to 20–25° C. The mixture is kept for several hours at about 20° C., during which time there separates from the solution, which is brown-yellow from the first, para-diamino-chrysazine in good yield and purity. The product is worked up in the usual manner.

Instead of the amino compounds of the 4 last examples also alkylamino compounds, such as methylamino compounds, may, of course, be used.

What I claim is:—

1. A process for eliminating sulphonic acid groups from compounds of the general formula

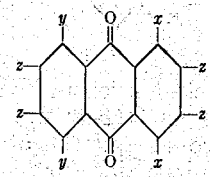

in which one $x$ stands for an OH-group and the other $x$ for an NHR-group (R meaning H, alkyl or aryl), $y$ for hydrogen, OH or an NHR-group (R meaning H, alkyl or aryl), and in which the $z$'s standing in the 2- and 3-position one means an $SO_3H$-group and the other a hydrogen atom, and of the $z$'s standing in the 6- and 7-position one means a hydrogen atom and the other a hydrogen atom or an $SO_3H$-group, this $SO_3H$-group standing in o-position to an OH- or an NHR-group, consisting in treating these compounds, so as to form leuco derivatives, in aqueous solutions of alkali metal hydroxides, in the absence of air and at temperatures which do not lie essentially above 0° C., with such quantities of reducing agents which correspond to about 2 hydrogen atoms for each sulphonic acid group to be eliminated, and subsequently feebly heating the resulting product.

2. A process for eliminating sulphonic acid groups from dihydroxydiaminoanthraquinonedisulphonic acids of the general formula

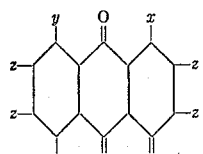

in which one $x$ stands for an NHR-group (R meaning hydrogen or alkyl), and the other $x$ for an OH-group, one $y$ stands for an NHR-group (R meaning hydrogen or alkyl), and the other $y$ for an OH-group, and in which further those of the four $z$'s which stand in $o$-position to an OH-group mean a sulphonic acid group, and those $z$'s which stand in $o$-position to an amino group mean a hydrogen atom, consisting in treating these dihydroxydiaminoanthraquinonedisulphonic acids, so as to form leuco derivatives, in aqueous solutions of alkali metal hydroxides, in the absence of air and at temperatures of about 0° C. with such quantities of reducing agents which correspond to about 2 hydrogen atoms for each sulphonic acid group to be eliminated, and subsequently feebly heating the resulting product.

3. A process for eliminating sulphonic acid groups from dihydroxydiaminoanthraquinonedisulphonic acids of the general formula

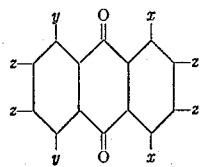

in which one $x$ stands for an NH$_2$-group, and the other $x$ for an OH-group, one $y$ stands for an NH$_2$-group, and the other $y$ for an OH-group, and in which further those of the four $z$'s which stand in $o$-position to an OH-group mean a sulfonic acid group, and those $z$'s which stand in $o$-position to an amino group mean a hydrogen atom, consisting in treating these dihydroxydiaminoanthraquinonedisulphonic acids, so as to form leuco derivatives, in aqueous solutions of alkali metal hydroxides, in the absence of air and at temperatures of about 0° C. with such quantities of reducing agents which correspond to about 2 hydrogen atoms for each sulphonic acid group to be eliminated, and subsequently feebly heating the resulting product.

4. A process for eliminating a sulphonic acid group from dihydroxydiaminoanthraquinonedisulphonic acids of the general formula

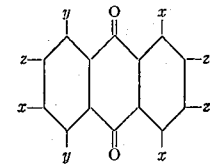

in which one $x$ stands for an NH$_2$-group, and the other $x$ for an OH-group, one $y$ stands for an NH$_2$-group, and the other $y$ for an OH-group, and in which further those of the four $z$'s which stand in $o$-position to an OH-group mean a sulphonic acid group, and those $z$'s which stand in $o$-position to an amino group mean a hydrogen atom, consisting in treating these dihydroxydiaminoanthraquinonedisulphonic acids, so as to form leuco derivatives, in aqueous solutions of alkali metal hydroxides, in the absence of air and at temperatures of about 0° C. with such quantities of reducing agents which correspond to about 2 hydrogen atoms, and subsequently feebly heating the resulting product.

In witness whereof I have hereunto signed my name this 21st day of January 1932.

PAUL GROSSMANN.